United States Patent [19]

Dereser et al.

[11] 4,235,764

[45] Nov. 25, 1980

[54] SIZE COMPOSITION

[75] Inventors: Ernst H. Dereser; Jean-Marie Meulders, both of Battice, Belgium

[73] Assignee: Owens-Corning Fiberglas Corporation, Toledo, Ohio

[21] Appl. No.: 866,141

[22] Filed: Dec. 30, 1977
(Under 37 CFR 1.47)

[51] Int. Cl.$^3$ ............................................. C08L 77/00
[52] U.S. Cl. .................. 260/29.6 NR; 260/29.6 WA; 428/392
[58] Field of Search ............... 260/29.6 NR, 29.6 WA, 260/29.6 WB; 428/375, 392, 415, 435, 442

[56] References Cited

U.S. PATENT DOCUMENTS

| | | | |
|---|---|---|---|
| 3,249,412 | 5/1966 | Kolek | 260/29.6 NR |
| 3,772,870 | 11/1973 | Wong | 260/29.6 NR |
| 3,817,898 | 6/1974 | Ward | 260/29.6 NR |
| 3,935,344 | 1/1976 | Haggerty | 428/447 |
| 4,126,729 | 11/1978 | Richardson | 260/29.6 WA |

*Primary Examiner*—Paul R. Michl

*Attorney, Agent, or Firm*—Ronald C. Hudgens; Philip R. Cloutier; James B. Wilkens

[57] ABSTRACT

A size composition for glass fibers is disclosed. The composition consists essentially of an aqueous dispersion of a polyvinyl alcohol, a water dispersible cationic epichlorohydrin polyamide copolymer and a flocculent polymer. The polyvinyl alcohol has a degree of hydrolysis ranging from 85 percent to 90 percent and a molecular weight such that a 4 percent by weight aqueous solution thereof has a viscosity of from 4 to 6 centipoises. The cationic epichlorohydrin polyamide copolymer is one wherein the polyamide can be based upon diethylene triamine. The flocculent polymer is a medium-high to high cationic polymer or copolymer having a quaternized amine function. The polymer or copolymer is of at least 40 percent by weight of a monomer having an acrylic function and an amine function where the acrylic function is acrylate or methacrylate, any co-monomer being an acrylamide. The quaternized copolymer has a molecular weight sufficiently high that a 1 percent solution thereof in water has a Brookfield viscosity from 1200 to 1600 centipoises.

5 Claims, No Drawings

SIZE COMPOSITION

Glass fibers have been used in many different ways in the production of reinforced articles. One such way has involved the use of more or less conventional paper making techniques; comparatively short lengths of glass fibers are agitated vigorously in water to produce a slurry which is then cast onto a screen through which the water of the slurry flows, and on which the fibers collect in a paper-like sheet. Such sheets have been produced, and, after drying, are useful in many reinforcing applications. However, glass fibers are highly abrasive and, lacking adequate protective coating, usually called a size, will break down during the mixing process, thereby reducing their effectiveness at reinforcement.

The present invention is based upon the discovery of a size composition which can be applied to glass fibers, and which is effective to minimize fiber degradation during the previously described agitation step. As a consequence of the minimized degradation, the effectiveness of the ultimate paper-like sheet material as a reinforcing medium is significantly improved. The size composition according to the invention consists essentially of an aqueous dispersion of a particular grade of polyvinyl alcohol, a water dispersible cationic epichlorohydrin polyamide and a flocculent polymer that is a medium-high to high cationic polymer or copolymer having a quaternized amine function. The polymer or copolymer is of at least 40 percent* of a monomer having an acrylic function and an amine function** where the acrylic function is acrylate or methacrylate, any co-monomer being an acrylamide, e.g., acrylamide itself, methacrylamide or the like. The quaternized polymer or copolymer has a molecular weight sufficiently high that a 1 percent solution thereof in water has a Brookfield viscosity from 1200 to 1600 centipoises. The polyvinyl alcohol in a size composition according to the invention is one where from 85 percent to 90 percent of the acetate groups in the polyvinyl acetate that is initially produced have been hydrolyzed to hydroxyls; the molecular weight of the polyvinyl alcohol is such that a 4 percent aqueous solution thereof has a viscosity of from 4 to 6 centipoises. The water dispersible cationic epichlorohydrin polyamide in a size composition according to the invention can be produced by reacting a dicarboxylic acid, such as adipic acid with a polyalkylene polyamine, e.g. diethylene triamine, to produce a long chain polyamide, and then reacting the polyamide with epichlorohydrin. The polyalkylene polyamine and the dicarboxylic acid are usually reacted in substantially equal molecular proportions, any excess usually being of the polyalkylene polyamine. The amount of epichlorohydrin reacted with the polyamide is preferably from about 0.9 mole to about 1.5 moles per equivalent of the polyamide, where an equivalent of the polyamide is the average molecular weight thereof divided by the number of secondary amine groups per molecule. The minimum proportion of epichlorohydrin is substantially sufficient to convert all of the secondary amine groups of the polyamide to tertiary amine groups, while the maximum proportion is sufficient to convert a substantial number of the secondary amine groups to quaternary ammonium groups.

*The terms "percent" and "parts" are used herein, and in the appended claims, to refer to percent and parts by weight, unless otherwise indicated.

**Methacryloyloxyethyltrimethylammoniummethyl sulfate is an example of such a monomer.

A lubricant can advantageously be used in a size composition according to the invention. Preferably, the lubricant is an oil containing at least one surfactant to enable it to form an emulsion in the size composition. An example of a suitable lubricant is commercially available under the trade designation Emerlube 7484.

It is preferred that the solids content of a size composition according to the invention range from about 1 percent to about 3 percent, as this enables the formation of a protective coating on the sized fibers which has been found to be adequate for the previously described paper-making technique. A higher solids concentration can be employed, but ordinarily serves no particularly useful function. Most desirably, the solids of the size according to the invention are composed of from 90 percent to 95 percent of polyvinyl alcohol, from 1 percent to 3 percent of the epichlorohydrin polyamide copolymer and from 4 percent to 6 percent of the flocculant polymer.

The following Example is presented solely for the purpose of further illustrating and disclosing, and not of limiting, the invention.

EXAMPLE

A size composition according to the present invention was produced from 21.74 parts polyvinyl alcohol, 4.35 parts of a lubricant which is commercially available under the trade designation Emerlube 7484, 5.00 parts epichlorohydrin polyamide copolymer, 1.00 part medium-high cationic copolymer having a quaternized amine function and sufficient deionized water to provide a solids content of 2.2 percent.

Premix tanks, each equipped with a comparatively high speed, propeller-type agitator which was operated to cause agitation of a premix produced therein were charged as follows:

Premixer No. 1

300 parts deionized water followed by the polyvinyl alcohol and, ultimately, 200 additional parts water. This premixer was equipped with a circulating pump, in addition to the agitator; after the first water charge, this pump was used to withdraw a stream of water from the premixer, and to return that stream thereto to eliminate polyvinyl alcohol agglomeration. After the addition of the polyvinyl alcohol, the charge was heated to 75° C., and was then cooled; when the temperature reached one within the range of 30° to 35° C. the second 200 part addition of deionized water was made.

Premixer No. 2

13 parts water heated to approximately 70° C., followed by the lubricant.

Premixer No. 3

155 parts water at a temperature of about 25° C., followed by the epichlorohydrin polyamide copolymer.

After the final water addition, the contents of Premixer No. 1 were charged to a mixing tank having a slow speed (about thirty revolutions per minute) driven agitator extending across the bottom thereof. The contents of Premixer No. 2, after approximately ten minutes of agitation, were transferred to the mixing tank, followed by the contents of Premixer No. 3, again, after approximately ten minutes of agitation. The medium-high cationic copolymer, in a dry condition, was then aspirated, using the Venturi principle into a stream of water in the proportion of 1 part of the copolymer to 300 parts water, and this stream was transferred to the mixing tank.

The premixers and the aspirating line were washed with water at about 25° C., which water was added to the mixing tank. After all additions were complete, the solids content was adjusted to 2.20 percent.

The resulting size was then applied to roving, as that roving was being formed from 4000 filaments, 0.0009 to 0.00095 inch in diameter. Such roving was then chopped to about one-half inch lengths; the chopped glass fibers were then added to a mixer and agitated vigorously to form a suspension, which was then cast onto the screen of a conventional paper-making machine. The resulting paper was found to have substantially improved properties by comparison with paper made in a similar manner from unsized fibers or from fibers sized only with the polyvinyl alcohol or with the polyvinyl alcohol, the lubricant and vinyl-tris (2-methoxyethoxy) silane.

The particular polyvinyl alcohol used in the foregoing Example was one wherein the percent hydrolysis of acetate groups to hydroxyl groups was from 87 to 89 percent, and the molecular weight was such that a 4 percent solution thereof in water had a viscosity of substantially 5 centipoises. The flocculent polymer used was medium-high cationic in nature, and had a molecular weight believed to be well in excess of three million, as indicated by its production of a 1 percent aqueous solution having a Brookfield (LVF, 60 rpm.) viscosity of 1550 centipoises. The epichlorohydrin polyamide copolymer was produced by the method briefly described above, and was based upon a long chain polyamide made from diethylene triamine.

Substantially the same results reported in the foregoing Example have also been used where the flocculent polymer was highly cationic, again having a quaternized amine function, and being a homopolymer of a monomer having an acrylic function and an amine function where the acrylic function is acrylate or methacrylate. The molecular weight of the particular polymer was sufficiently high that a 1 percent solution thereof in water had a Brookfield viscosity of about 1600 centipoises.

When, for purposes of comparison, but not in accordance with the instant invention, the procedure of the foregoing Example was repeated except that the epichlorohydrin polyamide copolymer was omitted, it was not found to be possible to produce a workable aqueous size composition.

It will be apparent that various changes and modifications can be made with respect to the invention as specifically described herein without departing from the spirit and scope of the attached claims.

What we claim is:

1. A size composition for glass fibers, said composition consisting essentially of an aqueous dispersion of a polyvinyl alcohol, 85 percent to 90 percent hydrolysis, and a molecular weight such that a 4 percent aqueous solution thereof has a viscosity of from 4 to 6 centipoises, a water dispersible cationic epichlorohydrin polyamide copolymer where the polyamide is based upon a polyalkylene polyamide and a flocculent polymer that is a medium-high to high cationic polymer or copolymer having a quaternized amine function, said polymer or copolymer being of at least 40 percent of a monomer having an acrylic function and an amine function where the acrylic function is acrylate or methacrylate, and any co-monomer being an acrylamide, said quaternized copolymer having a molecular weight sufficiently high that a 1 percent solution thereof in water has a Brookfield viscosity from 1200 to 1600 centipoises.

2. A size composition as claimed in claim 1 which additionally contains a lubricant.

3. A size composition as claimed in claim 1 where the total solids content ranges from 1 percent to 3 percent.

4. A size composition as claimed in claim 3 where the solids are composed of from 90 percent to 95 percent of polyvinyl alcohol, from 1 percent to 3 percent of the epichlorohydrin polyamide copolymer and from 4 percent to 6 percent of the flocculent polymer.

5. A glass fiber carrying a size formed by applying thereto the composition of claim 1.

* * * * *